US010005628B2

(12) United States Patent
Soule (10) Patent No.: US 10,005,628 B2
(45) Date of Patent: Jun. 26, 2018

(54) LOADING DOCK LOCKING SYSTEM (71) Applicant: Jeffrey Soule, Portland, ME (US)

(72) Inventor: Jeffrey Soule, Portland, ME (US)

(73) Assignee: Liftgate Lok Inc., Portland, ME (US)

( * ) Notice: Subject to any disclaimer, the term of this patent is extended or adjusted under 35 U.S.C. 154(b) by 201 days.

(21) Appl. No.: 14/921,233

(22) Filed: Oct. 23, 2015

(65) Prior Publication Data
US 2017/0113886 A1 Apr. 27, 2017

(51) Int. Cl.
*B65G 69/00* (2006.01)
*B60P 1/43* (2006.01)

(52) U.S. Cl.
CPC ............. *B65G 69/003* (2013.01); *B60P 1/43* (2013.01)

(58) Field of Classification Search
CPC .......... B65G 69/003; B60D 1/66; B60D 1/44; B60D 1/46; B60D 1/583; B62D 53/0857; B62D 53/0878; B62D 21/15; B60T 7/22; B60T 7/20; B60T 7/12; B60R 19/24; B60R 19/38; B60R 2019/02; B60R 2019/242; B60R 2019/26; B60P 1/431
See application file for complete search history.

(56) References Cited

U.S. PATENT DOCUMENTS

| 2,328,343 A | 8/1943 | Jacob |
| 2,990,212 A | 6/1961 | Nicastro |
| 3,171,673 A * | 3/1965 | Webber ............... B60D 1/465 280/477 |
| 3,233,758 A | 2/1966 | Darius |
| 4,514,002 A | 4/1985 | McIntosh |
| 4,641,871 A | 2/1987 | Vaughn |
| 4,664,218 A | 5/1987 | Graham et al. |
| 4,685,857 A * | 8/1987 | Goeser ................ B60P 1/431 296/26.1 |
| 5,101,927 A * | 4/1992 | Murtuza ............ B60K 31/0008 180/275 |
| 5,443,350 A | 8/1995 | Wilson |
| 5,632,518 A * | 5/1997 | Kendall ............... B60R 19/38 293/103 |
| 5,673,953 A * | 10/1997 | Spease ................ B60R 19/38 293/118 |
| 6,116,667 A | 9/2000 | Torcomian |
| 6,176,529 B1 * | 1/2001 | Kitzmiller ............ B60R 19/56 293/102 |
| 6,589,006 B1 | 7/2003 | Krause |
| 6,652,010 B1 * | 11/2003 | Huddle ................ B60R 19/56 293/102 |
| 6,814,378 B1 * | 11/2004 | Marmur ............... B60R 19/56 293/103 |
| 7,188,875 B2 | 3/2007 | Norelius |

(Continued)

FOREIGN PATENT DOCUMENTS

| CA | 2 639 510 | 3/2009 |
| EP | 2143591 A1 * | 1/2010 ............ B60R 19/38 |

(Continued)

*Primary Examiner* — Glenn F Myers
(74) *Attorney, Agent, or Firm* — Lambert & Associates (57) ABSTRACT A system for allowing a vehicle or trailer to be secured to a loading dock is provided. The system is capable of being stowed away into the vehicle or trailer when not in use, and moveable to a locking position for interfacing with the dock's restraining system when the vehicle or trailer is to be secured to the loading dock.

17 Claims, 6 Drawing Sheets

(56) References Cited

U.S. PATENT DOCUMENTS

| | | | |
|---|---|---|---|
| 7,488,025 B1 * | 2/2009 | Roberson | B60P 1/433 296/61 |
| 7,530,612 B2 * | 5/2009 | Regnell | B60R 19/56 293/118 |
| 7,762,756 B1 | 7/2010 | Ablabutyan et al. | |
| 7,806,647 B2 | 10/2010 | Gomes et al. | |
| 2001/0030431 A1 * | 10/2001 | Killday | B60R 19/56 293/118 |
| 2005/0002769 A1 | 1/2005 | Scheibel | |
| 2007/0048116 A1 | 3/2007 | Friedrich | |
| 2007/0065262 A1 | 3/2007 | Murphy | |
| 2011/0302756 A1 | 12/2011 | Schikevitz et al. | |
| 2012/0200114 A1 | 8/2012 | McNiel et al. | |
| 2014/0159342 A1 | 6/2014 | Kimener | |
| 2014/0252194 A1 | 9/2014 | Hopkins | |
| 2017/0210356 A1 * | 7/2017 | Kimener | B60S 9/08 |

FOREIGN PATENT DOCUMENTS

| | | | |
|---|---|---|---|
| GB | 1355586 A * | 6/1974 | B60T 7/12 |
| WO | 03000519 | 1/2003 | |
| WO | 2015106082 | 7/2015 | |

* cited by examiner

LOADING DOCK LOCKING SYSTEM

BACKGROUND OF THE INVENTION

Field of the Invention

The present invention relates generally to a system for locking or otherwise securing a trailer or vehicle to a loading dock. More particularly the present invention relates to a system for locking or otherwise securing a trailer or vehicle to a loading dock that can be stowed away into the trailer when not in use.

Description of Related Art

When loading a trailer or box truck from a building, typically a loading dock is used. The loading dock allows the trailer to be backed up to the floor of the building and easily loaded using, for example, fork lifts, hand trucks, and the like. However, during such loading there is a danger that the vehicle may roll away or otherwise move from the loading dock. This can cause severe safety hazards and damage freight being loaded into the trailer. Therefore, it is common in the art to lock the trailer or vehicle being loaded to the loading dock. Trailers for this type of loading typically have metal members extending downward that can lock to the loading docks. Similarly, vehicles such as semi-trailers, and cargo box trucks that do not have a method to securely attach to a loading dock restraining system are unable to safely and effectively move cargo from the building of the loading dock to the trailer, and vice versa.

When unloading a trailer or vehicle on locations such as at a street side, or ground level, it is not uncommon to have an under mounted "SLIDE OUT" lift that articulates out rearwards from the vehicle or trailer, then lifts and lowers freight from the vehicle having an elevated storage area. However, because these structures must be stowed underneath the storage area when not in use, any structure extending downward from the body interferes with the lift's operation. Therefore, locking structures that allow the trailer to be connected to a loading dock traditionally cannot be used with vehicles using such a lift gate.

Therefore, what is needed is a system that can allow a trailer or vehicle to be locked to a loading dock that can also be stowed to allow for a lift or other structure to operate on the trailer or box truck as well.

SUMMARY OF THE INVENTION

The subject matter of this application may involve, in some cases, interrelated products, alternative solutions to a particular problem, and/or a plurality of different uses of a single system or article.

In one aspect, a loading dock locking system is provided. The loading dock locking system is configured to be connected or otherwise installed on a vehicle or trailer to allow the vehicle/trailer to be restrained by a loading dock vehicle restraining system which holds the vehicle/trailer in place. The loading dock locking system may comprise a U-shaped member configured to be locked to a loading dock. The U-shaped member has at least one elongate arm and a perpendicular bar connected to a distal end of the elongate arm. The bar is configured to be locked to the vehicle restraining system of the loading dock. This U-shaped member is stowable such that when not in use, it can be hidden away, providing both safety and functionality enhancements to the vehicle/trailer. The U-shaped member is movable between this stowed position and a vertical locking position. In the stowed position, the arm is positioned under or within the body of the vehicle or trailer, for example, such that the U-shaped member is oriented approximately parallel to a floor of the body of the trailer or vehicle. In the vertical locking position, the arm is extended from the body and is oriented approximately vertically downward away from the body. In the vertical locking position, the loading dock's vehicle restraining system may interface with the bar, thereby preventing the vehicle from accidentally moving or shifting from the building.

In another aspect, a method of locking a vehicle or trailer to a loading dock is provided. This method may begin with positioning a vehicle and/or trailer have a loading dock locking system of the present invention by a loading dock. This system may have a U-shaped member configured to be locked to a loading dock. In one embodiment, the U-shaped member may have two elongate arms and a perpendicular bar connected to a distal end of each elongate arm, the bar being configured to be locked to a vehicle restraining system of the loading dock. The U-shaped member is movable between a stowed position and a vertical locking position. In the stowed position, the arm is positioned under or within the body of the vehicle or trailer, such that the U-shaped member is oriented approximately parallel to a floor of the body. In the vertical locking position, the arm is extended from the body and is oriented approximately vertically downward away from the body. The method further involves drawing the U-shaped member away from the rear of the trailer to an extended horizontal position. Next, the U-shaped member may be swung downward from the extended horizontal position to the vertical locking position. The U-shaped member is then locked in place in this vertical locking position. The trailer may then be backed up to abut the loading dock, and the bar may be locked to the loading dock's vehicle restraining system.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a mechanism to facilitate the locking of a trailer to a loading dock. The mechanism is stowable, such that when the trailer is not secured to the loading dock, the mechanism is hidden away within, for example, the structure of the trailer. This configuration allows the present invention to not interfere with a movable lift gates, crash barriers (rated and approved bumpers, among others), and other structures that are below or move below the floor of the trailer.

The term "trailer" will be used herein to refer to any portion of a vehicle or structure connectable to a vehicle that can be abutted to a loading dock. This may include semi-trailers, full trailers, a rear portion of a cargo box truck, and the like. The term trailer is a non-limiting term may apply to any and all of these structures, among others.

When the present invention is implemented on the back of vehicle trailers, it allows the trailer to be loaded at a loading dock safely, while also allowing the trailer to have an adjustable lift for loading or unloading at a non-loading dock site, such as on the street. Moreover, because the loading dock locking system is stowable, it need not be designed for car crash situations where its downward protrusion can be dangerous. As such, traditional crash barriers and/or bumpers may be used and the trailer need not be substantially modified to accommodate the present invention. Further still, the present invention may be retrofitted to existing trailers with only minor labor and material costs by making use of existing space below a deck of the trailer and by attaching the invention to the structure of the trailer.

The loading dock locking system of the present invention may be formed by a U-shaped member that is movable from a stowed position where it is slid approximately horizontally into an area of the trailer, to a vertical locking position where it extends from the trailer approximately vertically downward at a rear end of the trailer. However, it should be understood that any structure capable of attachment to a loading dock's vehicle restraint system may be used without straying from the scope of this invention. The term U-shaped member will be used herein for simplicity with the understanding that the connecting structure may be any shape without straying from the scope of the invention.

The U-shaped member may move between these positions in any way, however typically it may slide and pivot between the two positions. The U-shaped member may be secured in each position by, for example, pins, clamps, frictional structures, and the like. When in the vertical, locking position of the U-shaped member, the trailer may interface with a loading dock restraining system to be locked in place to the loading dock via the U-shaped member. This prevents the vehicle's accidental movement away from the dock. This locking may be done by existing, prior art dock restraining systems mounted to, or adjacent to, the loading docks. For example, one common dock restraining system is the Dok-Lok® of the Carlson Company. While in most embodiments the U-shaped member may be a unitary piece, in one embodiment it may be telescoping in length, having more than one lengthwise piece that may slide into each other to move between the stowed and locking positions.

The U-shaped member may be made of any materials resilient enough to attach the trailer securely to the loading dock restraining system. Materials of which the U-shaped member may be made include, but are not limited to: metals, plastics, wood, composite materials, ceramics, and the like.

Further, the loading dock locking system may, in some embodiments, comprise a safety mechanism that may ensure that the loading dock locking system is in the stowed position before transport. In one embodiment, the safety mechanism may be an alarm. In another embodiment, the safety mechanism may be a light on an instrumentation panel in the passenger area. In still another embodiment, the safety mechanism may be any structure or controller configured to either apply the brakes of the trailer, or otherwise lock wheels of the trailer in position to prevent movement of the trailer.

In a particular embodiment, the safety mechanism may apply the trailer's brakes at a certain predetermined speed of the trailer, which may allow the trailer to be moved away from the loading dock slowly. In still a further embodiment, the trailer brakes may be automatically applied when the trailer is moving at approximately three miles per hour if the system is not in the stowed position.

In one embodiment, the safety mechanism may be controlled by a physical actuator biased in the braking position that, when actuated, releases the brakes or disables the safety mechanism. In this embodiment, when the locking system U-shaped member is drawn away from its fully secured stowed position, its physical absence will allow the actuator of the safety mechanism to move to a braking position. This physical actuator may be, for example, a button, lever, tab, or the like that can be moved to a free, non-braking position by the presence of the U-shaped member in the stowed position. The physical actuator may also be tied to a locking pin that may hold the U-shaped member in the stowed position.

In another embodiment, a sensor may be used to detect a presence of the U-shaped member in the stowed position. This sensor may be electronic and may utilize an electronic and/or computerized safety system.

The present invention, in many embodiments, has the U-shaped member slideably positioned in a substantially horizontal position (+/−15 degrees) when in the stowed position within a housing formed by the trailer or connected to a structure of the trailer. In a particular embodiment, when in the stowed position, the U-shaped member may be approximately parallel to a floor of the trailer body. When a user wishes to move the device to the vertical locking position, a securing lock may be released (such as a pin, a clamp, detent, seat, or the like). The user may then pull the U-shaped member outward away from a rear of the trailer until it reaches its maximum extended position. The U-shaped member, in one embodiment, may have a tab, flange, spring-loaded pin fitting into an aperture of the member, or the like to prevent it from being fully removed from the housing and to identify its maximum extended position. The member may, at this extended position, be movable to a vertical position (+/−15 degrees) about an axis defined at its proximal end opposite to the bar by the trailer. Once in the vertical locking position, it may be secured in place by, for example, a lock, clamp, detent, seat, spring loaded tab fitting into a hole of the member, or the like. The user may then lock the distal end (having the bottom of the 'u') of the U-shaped member to the loading dock.

The present invention may be used in any manner and may be moved between the stowed position for transport and vertical locking position for securing to the loading dock in a number of ways. In one embodiment of use, the vehicle having the loading dock locking system may be positioned nearby to the loading dock. At this point, the U-shaped member can be moved from the stowed position to the vertical locking position to allow the trailer of the vehicle to be connected to the loading dock. This may be done by, in this embodiment, drawing the U-shaped member horizontally outward and away from the rear of the vehicle. At a maximally extended position of the U-shaped member, it will be in a horizontally extended position and will be prevented from moving further in this direction. At this point, the U-shaped member may be swung downward in a hinged manner about an axis at the proximal end of the arms opposite to the bar. Once the U-shaped member is swung downward to a vertical position, it may lock in place and be ready for interfacing with the loading dock vehicle restraining system. The trailer may then be positioned abutting (or very close to) the loading dock. When in position, the bar of the U-shaped member will be in proper position to interface with the dock's vehicle restraining system. Once interfaced, the trailer will be prevented from any substantial movement.

When the trailer is finished being loaded, the dock's restraining system may be disengaged from the bar. At this point, the trailer may be slowly drawn away from the loading dock. Once far enough away, the U-shaped member may be returned to the stowed position. This may be achieved by releasing or unlocking (depending on embodiment) the U-shaped member from its vertical locking position. The U-shaped member may then be swung upwardly (in an opposite motion to the downward swinging) to the horizontally extending position. Then from the horizontally extending position, the U-shaped member may be pushed inward toward the trailer until it is fully in the stowed position.

The U-shaped member may be movable between the stowed position and the vertical locking position in any manner. For example, the movement may be done manually by a user in one embodiment. In another embodiment, an automated system may move the U-shaped member between the stowed and vertical locking position. In the automated system embodiment, a motor, springs, pistons, drives, or other motive system may be used to achieve this movement. The motive system may be in communication with the U-shaped member.

Figure 1:
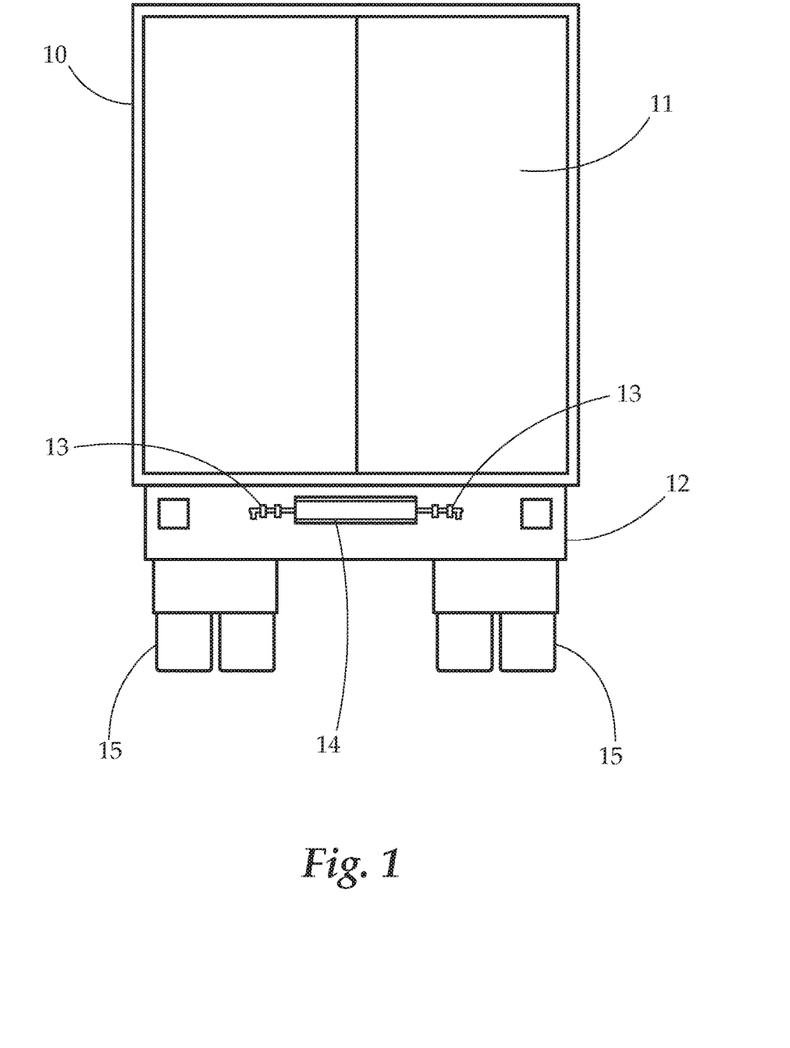
FIG. 1 provides a view of a trailer having an embodiment of the loading dock locking system of the present invention in a stowed position.

Turning now to FIG. 1, a view of the present invention in the stowed position is provided. A rear of a trailer 10 such as a semi-trailer, cargo box truck, or the like for freight shipping and other transport is shown. The rear of the trailer 10 has a door 11. Below the door is the bumper 12 and wheels 15. Between the bumper 12 and door 11 is the loading dock locking structure, with bar 14 and latches 13 being visible. The bar 14 is a lower part of a U-shaped member (see FIGS. 2-4) that is movable between the stowed position as shown in this figure and a vertical locking position. When in the vertical locking position, the U-shaped member (and thus the trailer) may be locked in a secured position to a loading dock.

Figure 2:
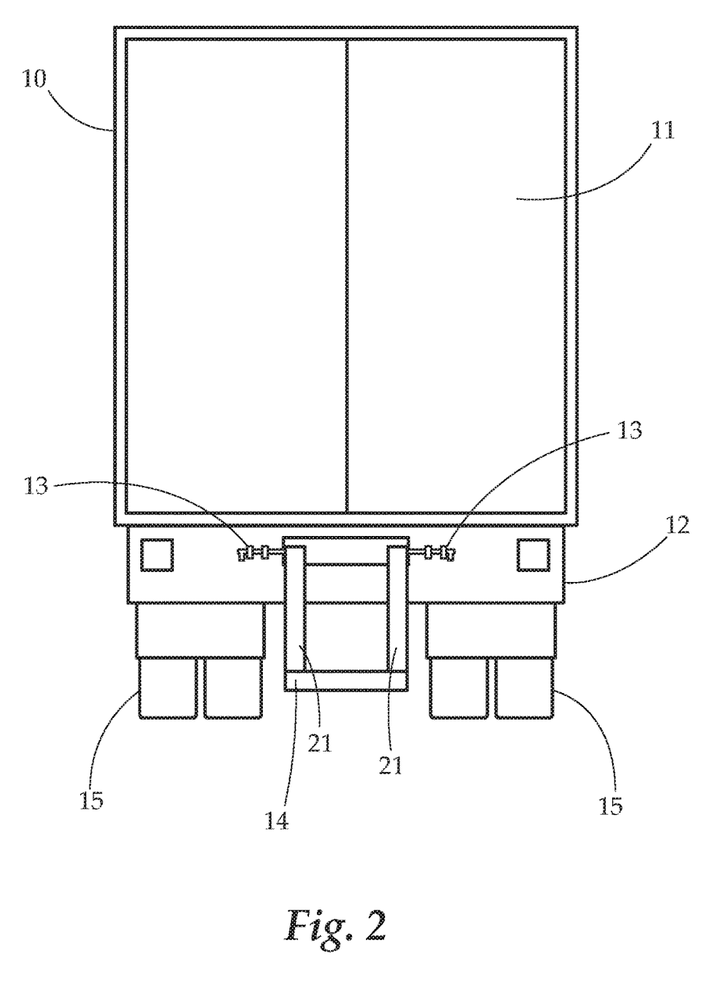
FIG. 2 provides a view of a trailer having an embodiment of the loading dock locking system of the present invention in a vertical locking position.

FIG. 2 shows another embodiment of the present invention in the vertical locking position. In this view, the U-shaped member can be seen which comprises bar 14 connecting to two approximately parallel arms 21 at the distal ends of the arms 21. The bar 14, in this view, is approximately perpendicular to the arms 21, but it should be understood that the bar 14 may be angled, curved, or the like, without straying from the scope of the present invention. In this position, bar 14 and arms 21 are locked in place as controlled by latch 13. A loading dock vehicle restraining system (not shown) may connect to the bar 14 when the trailer 10 is backed up to a loading dock, thereby holding the trailer 10 in position relative to the loading dock.

Figure 3:
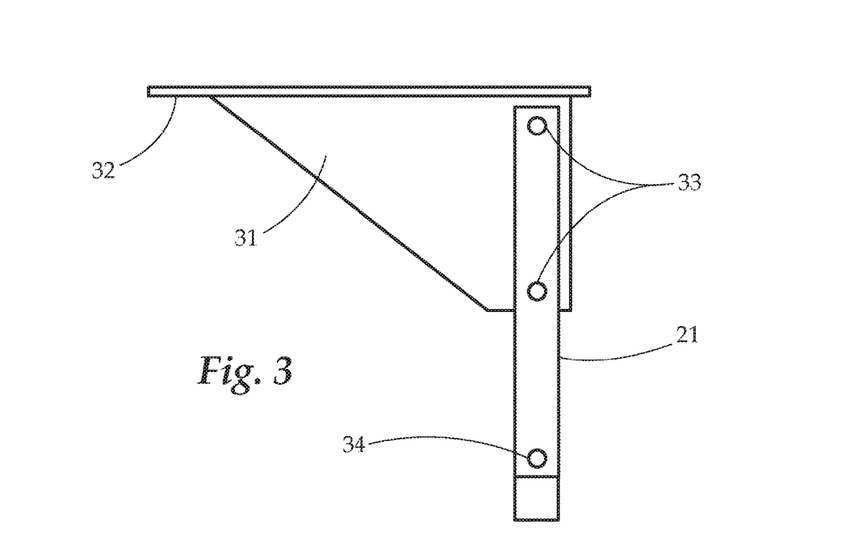
FIG. 3 provides a side view of an embodiment of the present invention.

FIG. 3 provides a side view of an embodiment of the loading dock locking system of the present invention. In this view, the U-shaped member is in the vertical position with arms 21 extending downward. The U-shaped member is mounted below a floor 32 of the trailer storage area to the trailer's structure. A gusset plate 31 extends from the floor downward to provide support for the arms 21 when in the vertical position. A plurality of apertures are formed in the arm 21. A front aperture 34 is to receive a pin when the U-shaped member is in the stowed position (see FIG. 1). The pin may be a spring loaded pin that holds the U-shaped member in place. This same pin may be used to secure arm 21 in the vertical extended position by fitting into the upper aperture 33. A third aperture 33 is positioned approximately midway down the length of the arm 21. This aperture 33 can receive a second pin to lock the arm 21 in the vertical position.

Figure 4:
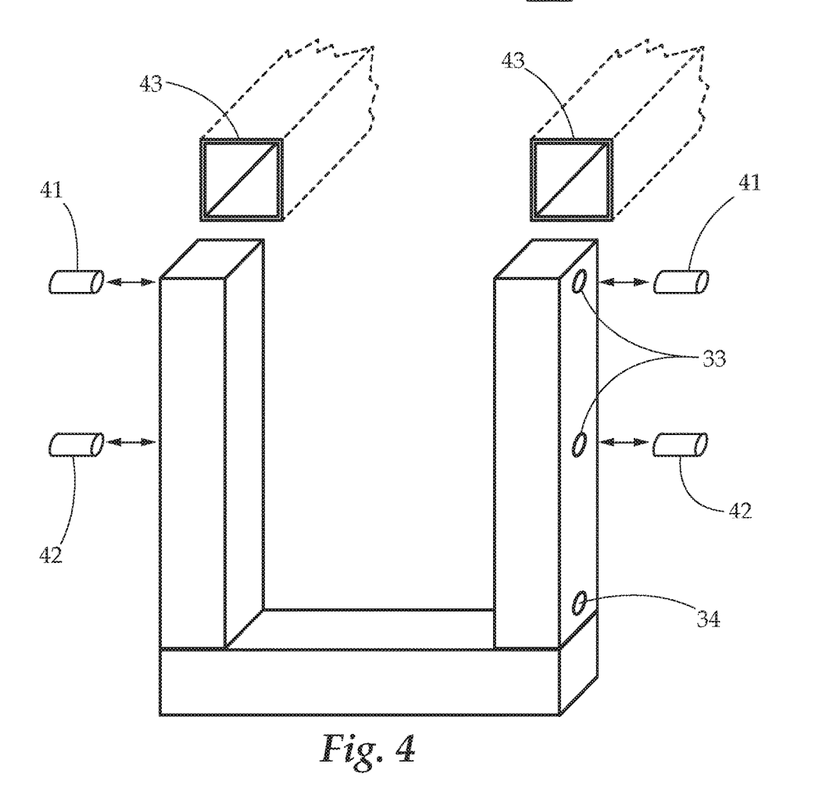
FIG. 4 provides a perspective view of an embodiment of the present invention.

FIG. 4 provides a perspective view of an embodiment of the loading dock locking system of the present invention. In this view, U-shaped member having bar 14 and arms 21 is shown in the vertical position. Apertures 33 and 34 can be seen in each arm. Upper apertures 33 are receiving a main pin 41 and a secondary pin 42. Two channels 43 are shown, in this embodiment as square tubing. Channels 43 may serve to guide the slideable U-shaped member when moving between the stowed and vertical extended position. In other embodiments, any structure may be used to guide the U-shaped member, such as a track, a roller, and the like, without straying from the scope of the present invention. Regardless of embodiment, the structure required to retain the U-shaped member in the stowed position may be mounted to the vehicle's structural members, such as beams, body, or other framing.

Figure 5:
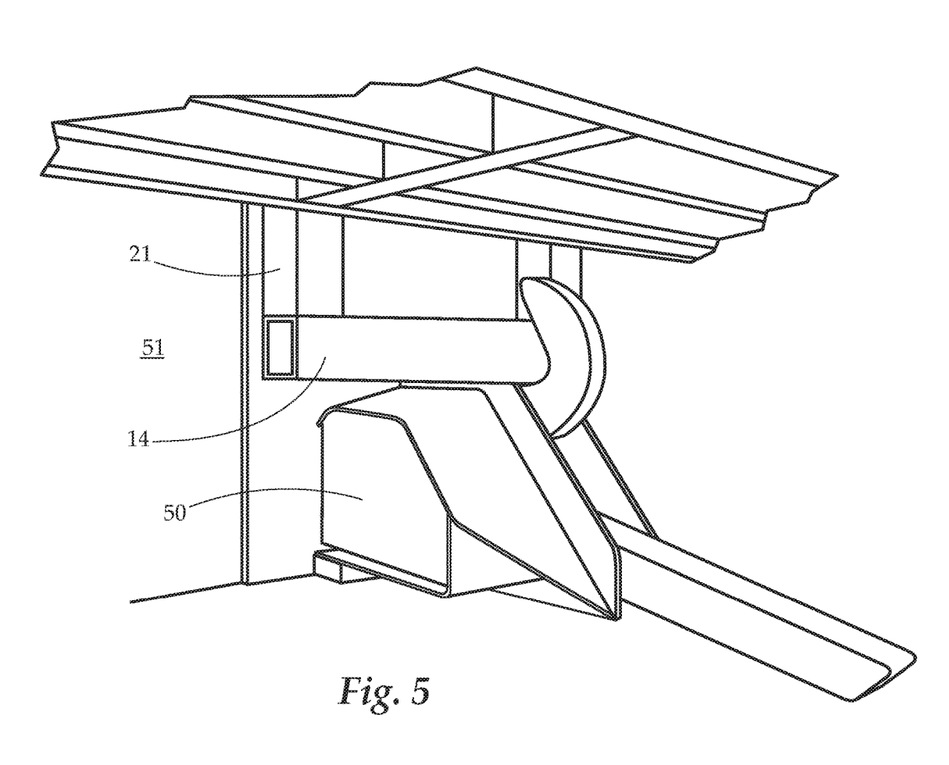
FIG. 5 provides a view of an embodiment of the present invention engaged with a loading dock restraining system.

FIG. 5 provides a view of an embodiment of the present invention locked in place to a loading dock. In this view, the trailer is backed up against a wall 51 of the loading dock. A vehicle restraining system 50 is mounted to the wall 51 and connects to the bar 14 of the U-shaped member when in its vertical locking position. As such, when the locking structure is connected to the U-shaped member, the trailer to which it is attached to is locked in position adjacent to the wall 51. This allows safe and reliable loading of the trailer without a danger of it accidentally rolling away from the wall.

Figure 6:
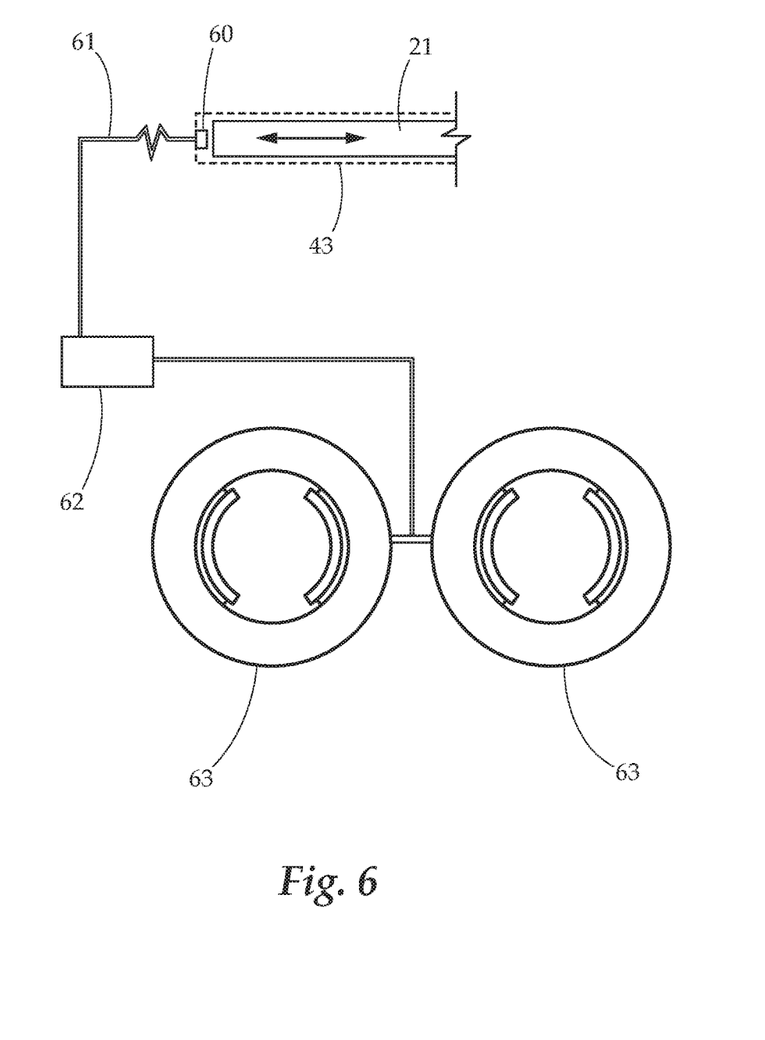
FIG. 6 provides a schematic view of an embodiment of a safety system of the present invention.

FIG. 6 provides a schematic view of an embodiment of a safety mechanism of the present invention. In this embodiment, the safety mechanism is configured to activate the braking system of the trailer if the arm 21 of the U-shaped member is not contacting a switch 60 to ensure that it is fully in the stowed position. As such, the safety mechanism ensures that the trailer cannot be hauled away and taken on the road ways until it is fully stowed. In one embodiment, the braking system may activate once the trailer is moving at a certain speed, to allow for some movement of the trailer away from the loading dock to allow for positioning of the trailer and to create enough space for the U-shaped member to be moved to the stowed position. In one embodiment, the safety mechanism may allow movement of the wheels up to 10 mph before the brakes are applied. In another embodiment, the safety mechanism may allow movement of the wheels up to 5 mph before the brakes are applied. In yet another embodiment, the safety mechanism may allow movement of the wheels up to 3 mph before the brakes are applied.

As is shown in FIG. 6, arm 21 is slideably movable along its length within channel 43. When arm 21 is fully stowed, its proximal end will contact switch 60, which is shown here as a button but can be any sort of physical actuator. Switch 60 is in communication (physical, hydraulic, pneumatic, electronic, or otherwise) with a braking system 62 of the trailer. The braking system is then able to activate or, if the switch 60 is depressed by arm 21, deactivate the brakes 63 on the wheel(s) of the trailer.

Figure 7:
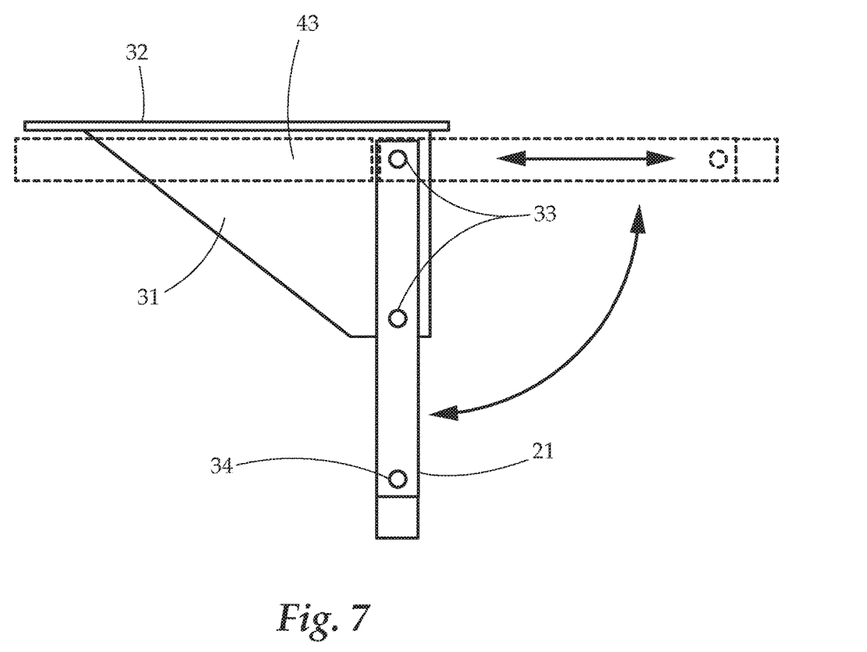
FIG. 7 provides a side view of an embodiment of the present invention in operation.

FIG. 7 provides a side view of an embodiment of the present invention and the operability of this embodiment. In this view, the U-shaped member is shown in solid lines in the vertical position with arms 21 extending downward. The U-shaped member is mounted below a floor 32 of the trailer storage area to the trailer's structure. A plurality of apertures are formed in the arm 21—a front aperture 34 and upper apertures 33. As is demonstrated by the curving arrow, the arm 21, and the rest of the U-shaped member can move between the vertical locking position (shown in solid lines) to the horizontal maximum extended position (shown in broken lines). Once in this maximum extended position, the arm 21 and the rest of the U-shaped member can move along an approximately horizontal plane into (and out of) channel 43 as indicated by the horizontal arrow. Once the U-shaped member is sufficiently within channel 43, it will be in a stowed position allowing, for example, use of a mechanical lift, access to under the vehicle, and the like.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A vehicle trailer comprising:
a body defining a storage space;
a plurality of wheels connected to the body;
a loading dock locking system connected to the body at a rear of the body, the loading dock locking system comprising:
a U-shaped member configured to be locked to a loading dock, the U-shaped member having an elongate arm and a perpendicular bar connected to a distal end of the elongate arm, the bar configured to be locked to the loading dock;
wherein the U-shaped member is movable between a stowed position for when the trailer is in transport, such that the arm is positioned under or within the body, having the U-shaped member oriented approximately parallel to a floor of the body, and a vertical locking position for locking the trailer to the loading dock, such that the arm is extended from the body and is oriented approximately vertically downward away from the body.

2. The vehicle trailer of claim 1 further comprising a safety braking system in communication with at least one of the plurality of wheels of the trailer, and wherein the safety braking system is configured to activate automatically if the U-shaped member is not in the stowed position, an activation of the safety braking system causing at least one of the plurality of wheels to stop a rotation.

3. The vehicle trailer of claim 2 further comprising a switch in communication with the safety braking system, the switch being positioned to be physically actuated when the U-shaped member is in the stowed position, the actuation of the switch preventing activation of the safety braking system.

4. The vehicle trailer of claim 1 wherein the U-shaped member is slideable from the stowed position to an extended horizontal position, and only when in the extended horizontal position is hingedly movable from the extended horizontal position to the vertical locking position about an axis at a proximal end of the arm.

5. The vehicle trailer of claim 1 wherein the U-shaped member is positioned below the floor of the body when in the stowed position.

6. The vehicle trailer of claim 1 wherein the arm defines a stowed position aperture at a distal end of the arm, and defines a vertical locking position aperture at a proximal end of the arm; and further comprising a spring loaded pin configured to fit into each aperture, the spring loaded pin having a spring biasing it into the apertures and being movable away from the apertures such that when moved away, the U-shaped member may move between the stowed and vertical locking positions and when the spring loaded pin passes through the apertures, the U-shaped member is prevented from movement.

7. The vehicle trailer of claim 1 wherein the U-shaped member has two arms, each arm joined together by the bar at the distal end of each arm.

8. The vehicle trailer of claim 1 further comprising a gusset plate attached to a floor of the body, the arm connectable to the gusset plate when in the vertical locking position.

9. The vehicle trailer of claim 1 wherein the arm is slideable within a channel formed by a tube when moving to and from the stowed position.

10. The vehicle trailer of claim 1 further comprising a bumper.

11. The vehicle trailer-of claim 1 further comprising an electronic sensor, the sensor being positioned to be actuated when the U-shaped member is in the stowed position.

12. The vehicle trailer of claim 1 further comprising a lift gate.

13. A vehicle comprising:
a body defining a storage space;
a plurality of wheels connected to the body;
a loading dock locking system connected to the body at a rear of the body, the loading dock locking system comprising:
a U-shaped member configured to be locked to a loading dock, the U-shaped member having an elongate arm and a perpendicular bar connected to a distal end of the elongate arm, the bar configured to be locked to the loading dock;
wherein the U-shaped member is movable between a stowed position for when the trailer is in transport, such that the arm is positioned under or within the body, having the U-shaped member oriented approximately parallel to a floor of the body, and a vertical locking position for locking the trailer to the loading dock, such that the arm is extended from the body and is oriented approximately vertically downward away from the body; and
wherein the U-shaped member is slideable from the stowed position to an extended horizontal position, and only when in the extended horizontal position is hingedly movable from the extended horizontal position to the vertical locking position about an axis at a proximal end of the arm.

14. The vehicle of claim 13 further comprising an electronic sensor, the sensor being positioned to be actuated when the U-shaped member is in the stowed position.

15. The vehicle of claim 13 wherein each arm is slideable within a channel formed by a tube when moving to and from the stowed position.

16. The vehicle of claim 13 a safety braking system in communication with at least one of the plurality of wheels of the trailer, and wherein the safety braking system is configured to activate automatically if the U-shaped member is not in the stowed position.

17. The vehicle of claim 13 further comprising a lift gate.

* * * * *